(12) United States Patent
Nederhoed et al.

(10) Patent No.: US 12,042,990 B1
(45) Date of Patent: Jul. 23, 2024

(54) METHOD FOR CREATING PART WITH LOCALIZED MAGNETIC PROPERTIES USING MATERIAL EXTRUSION ADDITIVE MANUFACTURING

(71) Applicant: GM Global Technology Operations LLC, Detroit, MI (US)

(72) Inventors: Rachel Nederhoed, Royal Oak, MI (US); Qigui Wang, Rochester Hills, MI (US); Jeffrey Harris, Detroit, MI (US); Stanley Tong, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/149,365

(22) Filed: Jan. 3, 2023

(51) Int. Cl.
| | | |
|---|---|---|
| *B29C 64/194* | (2017.01) | |
| *B29C 64/118* | (2017.01) | |
| *B29C 64/393* | (2017.01) | |
| *B33Y 10/00* | (2015.01) | |
| *B33Y 50/02* | (2015.01) | |
| *B33Y 80/00* | (2015.01) | |

(52) U.S. Cl.
CPC .......... *B29C 64/194* (2017.08); *B29C 64/118* (2017.08); *B29C 64/393* (2017.08); *B33Y 10/00* (2014.12); *B33Y 50/02* (2014.12); *B33Y 80/00* (2014.12)

(58) Field of Classification Search
CPC ... B29C 64/194; B29C 64/118; B29C 64/393; B33Y 10/00; B33Y 50/02; B33Y 80/00
See application file for complete search history.

(56) References Cited

U.S. PATENT DOCUMENTS

| | | | |
|---|---|---|---|
| 10,254,499 B1* | 4/2019 | Cohen | B29C 64/321 |
| 2002/0055763 A1* | 5/2002 | Zarinetchi | H01F 38/14 |
| | | | 607/61 |
| 2015/0183161 A1* | 7/2015 | Molinari | B29C 64/118 |
| | | | 425/375 |
| 2016/0108194 A1* | 4/2016 | Topolkaraev | C08J 5/04 |
| | | | 521/134 |
| 2016/0197417 A1* | 7/2016 | Busbee | H05K 3/325 |
| | | | 439/38 |
| 2016/0289842 A1* | 10/2016 | Shen | C08J 7/046 |
| 2017/0081534 A1* | 3/2017 | Shah | C09D 11/037 |
| 2018/0142108 A1* | 5/2018 | Lewis | B29C 64/209 |
| 2020/0198213 A1* | 6/2020 | Rizzo | B32B 3/263 |
| 2020/0298493 A1* | 9/2020 | Wilds | B33Y 50/00 |
| 2020/0303320 A1* | 9/2020 | Kong | H05K 9/0026 |
| 2020/0307077 A1* | 10/2020 | Gibson | B29C 64/255 |
| 2022/0203442 A1* | 6/2022 | Firdosy | B22F 3/15 |

* cited by examiner

*Primary Examiner* — Jeffrey M Wollschlager
*Assistant Examiner* — Guy F Mongelli
(74) *Attorney, Agent, or Firm* — Vivacqua Crane, PLLC

(57) ABSTRACT

A three-dimensional part as well as a method and system for creating the three-dimensional part. The three-dimensional part including a first portion of a three-dimensional part formed from a first plurality of successively deposited layers, with a cavity defined in the first portion of the three-dimensional part. A magnet is inserted in the cavity and a cover disposed on the magnet in the cavity. In addition, a second portion of the three-dimensional part is formed form a second plurality of successively deposited layers deposited on the first portion of the three-dimensional part and the cover.

20 Claims, 6 Drawing Sheets

METHOD FOR CREATING PART WITH LOCALIZED MAGNETIC PROPERTIES USING MATERIAL EXTRUSION ADDITIVE MANUFACTURING

BACKGROUND

To create a part with localized magnetic properties a magnet may be embedded into the part using various processes. For example, an insert molding process may be used, in which a part is injection molded over an unmagnetized part that is magnetized after molding. However, the process may be complicated by the necessity of holding the magnet in place in the injection molding cavity during the injection molding process. In another example, a part may be molded including a cavity or a portion of the part may be resected to make a cavity for receiving the magnet. After inserting the magnet, the cavity is covered with a piece that is glued to the component. However, this process results in cut lines and glue remnants.

Another process that has been explored for embedding a magnet into a part is extrusion additive manufacturing. Extrusion additive manufacturing is a technique of forming a three-dimensional part by depositing a material, typically in the form of a polymer filament, in successive layers on a support bed. The polymer passes through the barrel of an extruder mounted to a print head. The barrel is often heated to reduce the viscosity of the polymer filament, allowing the polymer filament to flow sufficiently for deposition onto the support bed. The print head and support bed are moved relative to each other to deposit the layers of the material. The print head components, including the extruder barrel or block heater, may be formed from a number of materials, including metals or metal alloys that are magnetic.

While printing a three-dimensional part, the printing process may be paused to integrate or embed the magnet. However, when the extrusion barrel is formed from a magnetic material, the magnet may interfere with the extrusion process, reducing print quality or preventing completion of the print. Further, depending on printing temperatures used, the printing process may cause decay in the magnetic properties of the magnets being embedded in the part.

Thus, while current methods of making three-dimensional parts with magnets are effective, room remains for improvement in providing methods and systems for creating parts with localized magnetic properties using material extrusion additive manufacturing.

SUMMARY

According to various aspects, the present disclosure relates to a method of creating a part with localized magnetic properties for a vehicle. The method includes forming a first portion of a three-dimensional part by depositing a first plurality of successive layers onto a support bed. The first portion of the three-dimensional part defines a cavity. The method further includes inserting a magnet into the cavity and inserting a cover on the magnet in the cavity. The method also includes forming a second portion of the three-dimensional part by depositing a second plurality of successive layers onto the first portion of the three-dimensional part and the cover.

In embodiments, the method includes at least partially encapsulating the magnet in the cover and inserting the magnet, at least partially encased by the cover, into the cavity.

In any of the above embodiments, depositing a first plurality of successive layers onto the support bed comprises depositing a polymer extruded from an extrusion barrel. Further, depositing a second plurality of successive layers onto the support bed includes depositing the polymer extruded from the extrusion barrel. In additional embodiments, the method includes forming the cover before inserting the cover on the magnet in the cavity. In further embodiments, the method includes forming the cover concurrently with the first portion of the three-dimensional part by depositing a third plurality of successive layers onto the support bed. In any of the above embodiments, the method includes inserting the magnet into a first portion of the cavity having a first width and inserting the cover into a second portion of the cavity having a second width.

In any of the above embodiments, the method includes preforming the cover using a molding process.

In any of the above embodiments, the method includes forming a support and forming the first portion of the three-dimensional part on the support.

According to various aspects, the present disclosure is directed to a three-dimensional part with localized magnetic properties for a vehicle. The three-dimensional part includes a first portion of a three-dimensional part formed from a first plurality of successively deposited layers. The first portion of the three-dimensional part defines a cavity, and a magnet is inserted in the cavity. A cover is disposed on the magnet in the cavity. In addition, a second portion of the three-dimensional part is formed form a second plurality of successively deposited layers deposited on the first portion of the three-dimensional part and the cover.

In embodiments, the magnet is a permanent magnet including a material selected from one or more of the following materials: ferrite, magnetite, lodestone, cobalt, nickel, gadolinium, barium/strontium carbonate ceramic, alnico, samarium-cobalt, neodymium-iron-boron, and magnesium-aluminum alloys.

In any of the above embodiments, the first plurality of successive layers and second plurality of layers are formed from a polymer filament. In further embodiments, the polymer filament includes a polymer selected from one or more of the following polymers: polypropylene, polyethylene, polyamide, polyethylene terephthalate, polylactic acid, acrylonitrile butadiene styrene, polyethylene terephthalate glycol, thermoplastic elastomer, thermoplastic urethane, high impact polystyrene, polyvinyl acetals, polycarbonate, acrylonitrile styrene acrylate, polyoxymethylene, poly(methyl methacrylate), polycarbonate/acrylonitrile butadiene styrene blends, thermoplastic copolyester, polyetherimide, and polyether ether ketone.

In any of the above embodiments, the cover is formed from a material exhibiting a thermal conductivity k in the range of 0.1 W/m*K to 0.45 W/m*K.

In any of the above embodiments, the cover is formed from a third plurality of successively layers formed from a polymer filament. In further embodiments, the polymer filament includes a polymer selected from one or more of the following polymers: polyimide, polyethylene, polypropylene, polyethylene terephthalate, polymethylmethacrylate, polyether ether ketone, polyamide, polybutylene terephthalate, polyphenylene sulfide, and acrylonitrile-butadiene-styrene.

In any of the above embodiments, the cover at least partially encases the magnet.

According to various aspects, the present disclosure relates to a system for creating a three-dimensional part with localized magnetic properties for use in a vehicle. The three-dimensional part includes a cavity defined by a first portion of the part, a magnet disposed in the cavity, a cover disposed on the magnet, and a second portion of the three-dimensional part disposed on the first portion of the three-dimensional part and the cover. The system includes a computer. In addition, the computer includes a processor and a memory. The processor is configured to execute instructions stored in the memory to access information stored in memory regarding one or more of the following: a selected magnet, the information including a demagnetization temperature of the selected magnet, a magnetic field strength of the selected magnet, an operating temperature of an extrusion barrel in a three-dimensional printer for printing the part, and an extrusion barrel material. The processor is also configured to execute instructions to determine whether the extrusion barrel material is ferromagnetic and calculate a first minimum gap between the selected magnet and the extrusion barrel to prevent demagnetization of the selected magnet based on a heat transfer coefficient of a polymer used to form the cover. In addition, the processor is also configured to execute instructions to determine a second minimum gap between the selected magnet and the extrusion barrel to prevent magnetic interference between the magnet and the extrusion barrel. Further, the process is configured to execute instructions to determine a minimum thickness of a cover placed between the magnet and the extrusion barrel during printing. The minimum thickness is equal to the larger of the first minimum gap and the second minimum gap.

In embodiments of the above, the processor is further configured to select a depth of the cavity and create instructions for execution by the three-dimensional printer for printing the part defining the cavity.

BRIEF DESCRIPTION OF THE DRAWINGS

The drawings described herein are for illustration purposes only and are not intended to limit the scope of the present disclosure in any way.

DETAILED DESCRIPTION

Figure 1:
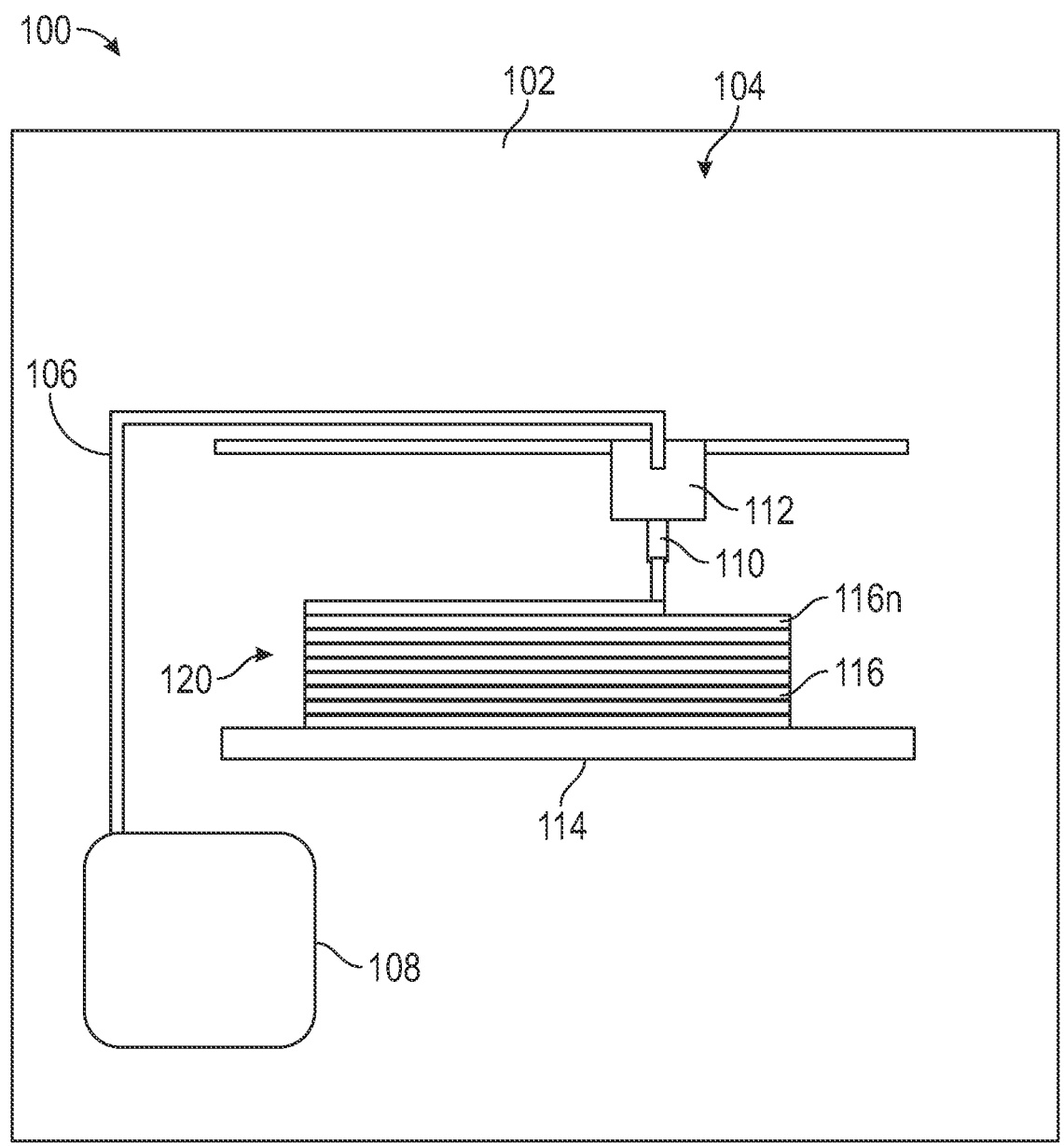
FIG. 1 illustrates a schematic of a three-dimensional printer according to several embodiments of the present disclosure.

The following description is merely exemplary in nature and is not intended to limit the present disclosure, application, or uses. Furthermore, there is no intention to be bound by any expressed or implied theory presented in the preceding introduction, summary, or the following detailed description. It should be understood that throughout the drawings, corresponding reference numerals indicate like or corresponding parts and features. Whenever possible, the same or similar reference numerals are used in the drawings and the description to refer to the same or like parts or steps. The drawings are in simplified form and are not to precise scale.

As used herein, the term "vehicle" is not limited to automobiles. While the present technology is described primarily herein in connection with automobiles, the technology is not limited to automobiles. The concepts can be used in a wide variety of applications, such as in connection with motorcycles, mopeds, locomotives, aircraft, marine craft, and other vehicles, or for use in non-vehicle or automotive parts that include magnets. Applications include, for example, driving navigation, air navigation, marine navigation, robotic navigation, and navigation in enclosed spaces or enclosed geological features, to name a few.

The present disclosure relates to methods and systems for creating parts with localized magnetic properties using material extrusion additive manufacturing. In general, the methods include fabricating a three-dimensional part. The methods include printing at least a portion of a three-dimensional part that defines a cavity for receiving the magnet, which provides the localized magnetic properties of the three-dimensional part. A cover or encasement is then used to reduce interference in printing due to the magnet by decreasing the proximity of the magnet from the extrusion barrel.

FIG. 1 illustrates an extrusion additive manufacturing device, which in the illustrated aspect is a three-dimensional printer 100. The three-dimensional printer 100 includes a housing 102 that defines a process chamber 104. A polymer filament 106 is supplied from a spool 108. Alternatively, the polymer may be supplied as a liquid from a supply container. The filament 106 is fed into an extrusion barrel 110 moved in a print head 112. If the polymer filament 106 is not already flowable, the extrusion barrel 110 includes a heater or heating block to heat the polymer and reduce the viscosity of the polymer filament 106 so that the polymer filament 106 is sufficiently flowable to be extruded from the extrusion barrel 110. The polymer filament 106 is deposited onto a support bed 114 in successive layers, which include a series of traces 116, 116n, onto the support bed 114 and to form and build the three-dimensional part 120. In embodiments, the extrusion barrel 110 is formed of a ferromagnetic material or, alternatively, of a non-ferromagnetic material.

Figure 2:
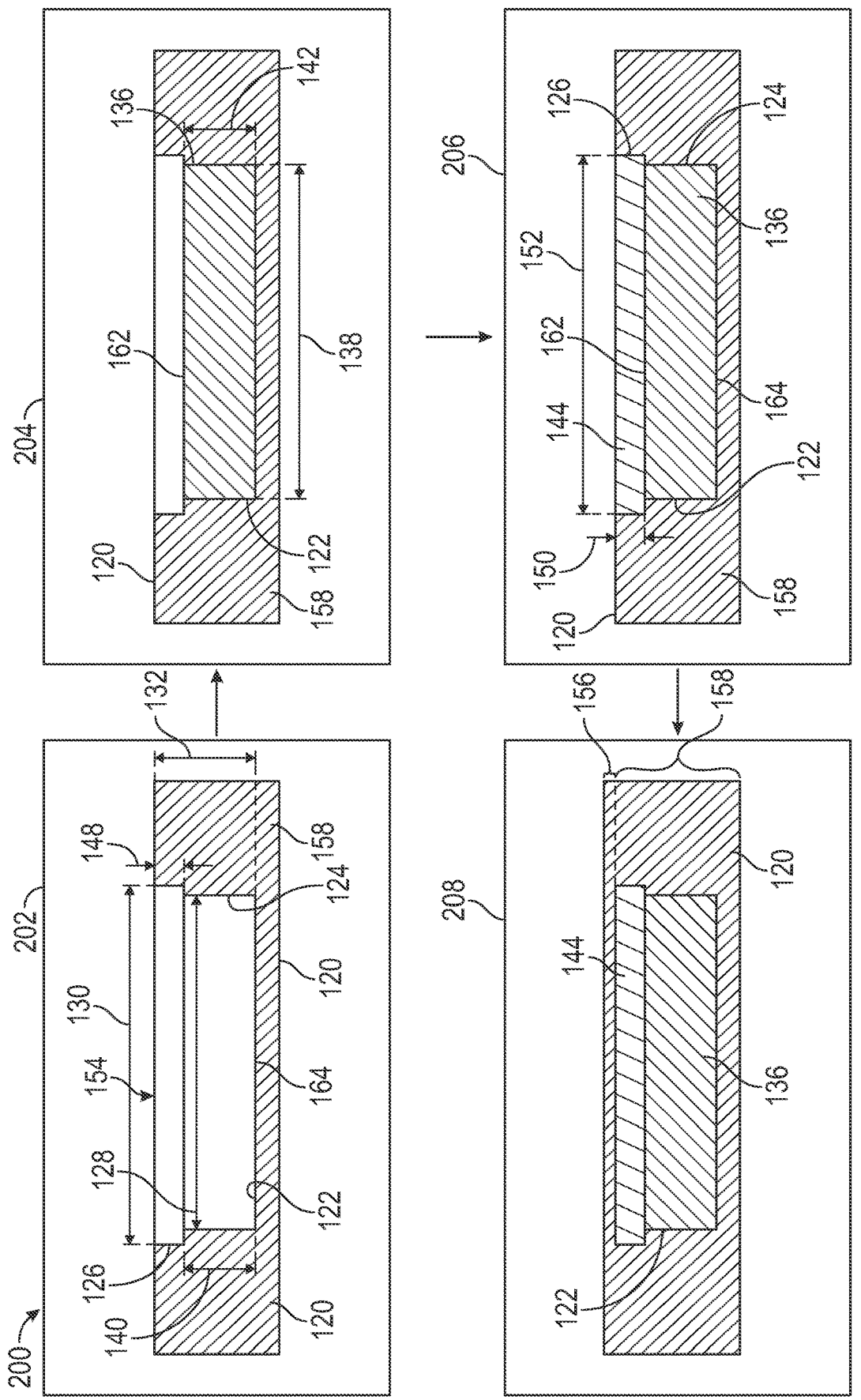
FIG. 2 illustrates a method of printing a three-dimensional part including an embedded magnet according to several embodiments of the present disclosure.

FIG. 2 illustrates a method 200 and system for creating parts with localized magnetic properties using material extrusion additive manufacturing. The method begins at block 202 where a three-dimensional part 120 is partially printed with the three-dimensional printer 100. The three-dimensional part includes a cavity 122 for receiving a magnet and a magnet cover. In the illustrated embodiment, the geometry of the cavity 122 changes to accommodate the magnet and magnet cover, wherein the cavity 122 includes a first portion 124 for the magnet and a second portion 126 for the magnet cover. The first portion 124 exhibits a first width 128 and the second portion 126 exhibits a second width 130, wherein the first width 128 is less than the second width 130. In alternative embodiments, only a first portion 124 of the cavity 122 may be present, wherein the cavity dimensions width remains constant through the entire depth 132 of the cavity 122. In further aspects, the cavity 122 exhibits multiple transitions in width.

At block 204, a magnet 136 is inserted into the cavity 122 defined by the three-dimensional part 120. The width 128 of the cavity may be the same as or slightly larger than the width 138 of the magnet 136 to accommodate for material expansion depending on the end use of the magnet 136 and three-dimensional part 120. In embodiments, the width 128 of the first portion 124 of the cavity 122 is sized so as to create an interference fit with the magnet 136, exhibiting a width 128 that is the same as the width 138 of the magnet 136 or slightly less than the width 138 of the magnet. In embodiments, the depth 140 of the first portion 124 of cavity 122 may be equal to or greater than the thickness 142 of the magnet 136. In alternative embodiments, the depth 140 of the first portion 124 of the cavity 122, or both the first portion 124 and second portion 126 of the cavity 122, may be less than the thickness 142 of the magnet 136.

At block 206, a cover 144 is inserted into the cavity 122 and disposed on at least one side 162 of the magnet 136. In embodiments, the cover 144 is formed separately from the three-dimensional part 120. The cover 144 is also formed by printing the cover 144 with a three-dimensional printer 100. It should be appreciated that the cover may be printed concurrently with the three-dimensional part 120. Alternatively, the cover 144 may be formed using a different process, such as injection molding. In addition, the cover 144 may be formed from the same polymer forming the three-dimensional part 120 or, alternatively, the cover 144 may be formed from a different material than that of the three-dimensional part 120.

As illustrated, the thickness 150 of the cover 144 is the same as the depth 148 of the second portion 126 of the cavity 122. Alternatively, the cover 144 may exhibit a thickness 150 that is greater than the depth 148 of the second portion 126 of the cavity 122. If a second portion 126 of the cavity 122 is not present, then the total depth of the cavity 122 may be greater than, the same as, or less than the thickness of the magnet 136 and the cover 144. In addition, as illustrated, the width 152 of the cover 144 is the same as or smaller than the second width 130 defined at the opening 154 of the cavity 122. In aspects, the width 152 of the cover 144 is sized so as to provide an interference fit between the cover 144 and the cavity 122. Further, while the cover 144 is illustrated as being wider than the magnet 136, the width 152 of the cover 144 may be the same width 128 as the magnet 136.

At block 208, the remaining portion 156 of the three-dimensional part 120 is printed over the cover 144, magnet 136, and the first portion 158 of the three-dimensional part 120 that was previously printed, sealing the cover 144 and the magnet 136 within the three-dimensional part 120. In embodiments, the remaining portion 156 of the three-dimensional part 120 is formed from the same material as the first portion 158 of the three-dimensional part. Alternatively, the remaining portion 156 of the three-dimensional part 120 is formed from a different material than the first portion 158 of the three-dimensional part 120.

Figure 3:
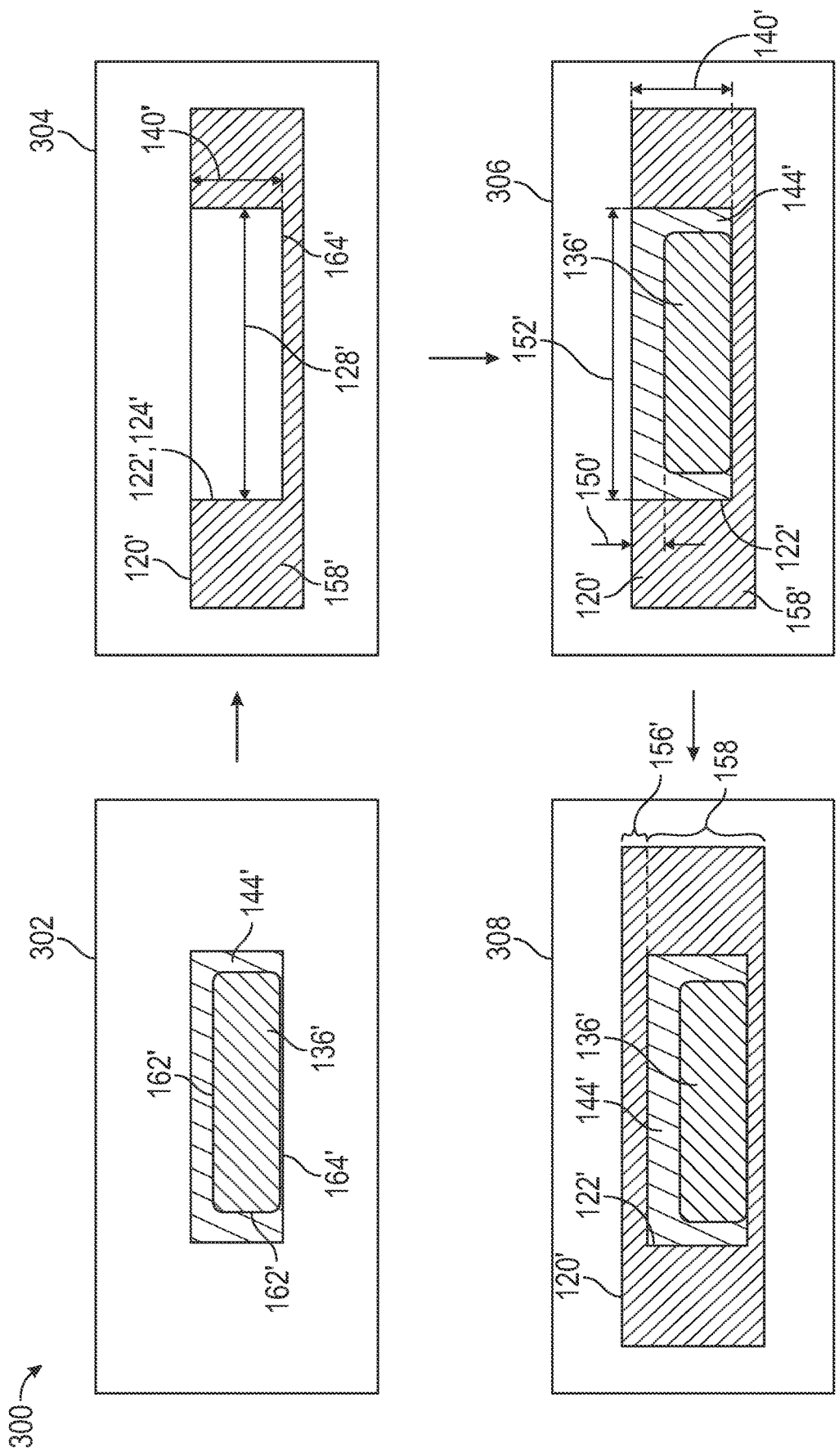
FIG. 3 illustrates a method of printing a three-dimensional part including an embedded magnet according to several embodiments of the present disclosure.

FIG. 3 illustrates a method 300 and system for creating parts with localized magnetic properties using material extrusion additive manufacturing similar to the above embodiments of FIG. 2 except for the cover 144' being an encasement surrounding more than one side 162' of the magnet 136' and partially or completed encapsulating the magnet 136'. The method 300 begins at block 302 where the magnet 136' is encased in a cover 144. In embodiments, the cover 144' is printed over the magnet 136'. In further embodiments, the cover 144' may be printed concurrently with the three-dimensional part 120'. Alternatively, the cover 144' may be molded over the magnet 136' using a process such as injection molding, extrusion, blow molding, etc. While not illustrated, one or more sides of the magnet 136', such as side 164', may be exposed and not encased by the cover 144'. In addition, the cover 144' is formed from the same material as the three-dimensional part 120'. Alternatively, the cover 144' may be formed from a different material than that of the three-dimensional part 120'.

At block 304, a three-dimensional part 120' is partially printed with the three-dimensional printer 100. The three-dimensional part defines a cavity 122' for receiving the magnet 136' and cover 144'. In the illustrated embodiment, the cavity 122' includes a first portion 124' that exhibits a first width 128'. While blocks 302 and 304 are illustrated as sequential, with block 302 preceding block 304; in embodiments, blocks 302 and 304 may be reversed with block 304 preceding block 302, or blocks 302 and 304 may be concurrent.

At block 306, the magnet 136', encased in the cover 144', is inserted into the cavity 122' defined by the three-dimensional part 120'. The width 128' of the of the cavity 122' may be sized so as to create an interference fit with the cover 144', exhibiting a width 128' that is the same as the width 152' of the cover 144'. In embodiments, the depth 140' of the cavity 122' may be equal to or greater than the thickness 150' of cover 144' and magnet 136'. In alternative embodiments, the depth 140' of the cavity 122' may be less than the thickness 150' of cover 144' and magnet 136'.

At block 308, the remaining portion 156' of the three-dimensional part 120' is printed over the cover 144', magnet 136', and first portion 158' of the three-dimensional part 120' that received the magnet 136' in the cover 144', sealing the cover 144' and the magnet 136' within the three-dimensional part 120'. In embodiments, the remaining portion 156' of the three-dimensional part 120' is formed from the same material as the first portion 158' of the three-dimensional part. Alternatively, the remaining portion 156' of the three-dimensional part 120' is formed from a different material than the first portion 158' of the three-dimensional part 120'.

Figures 4A, 4B:
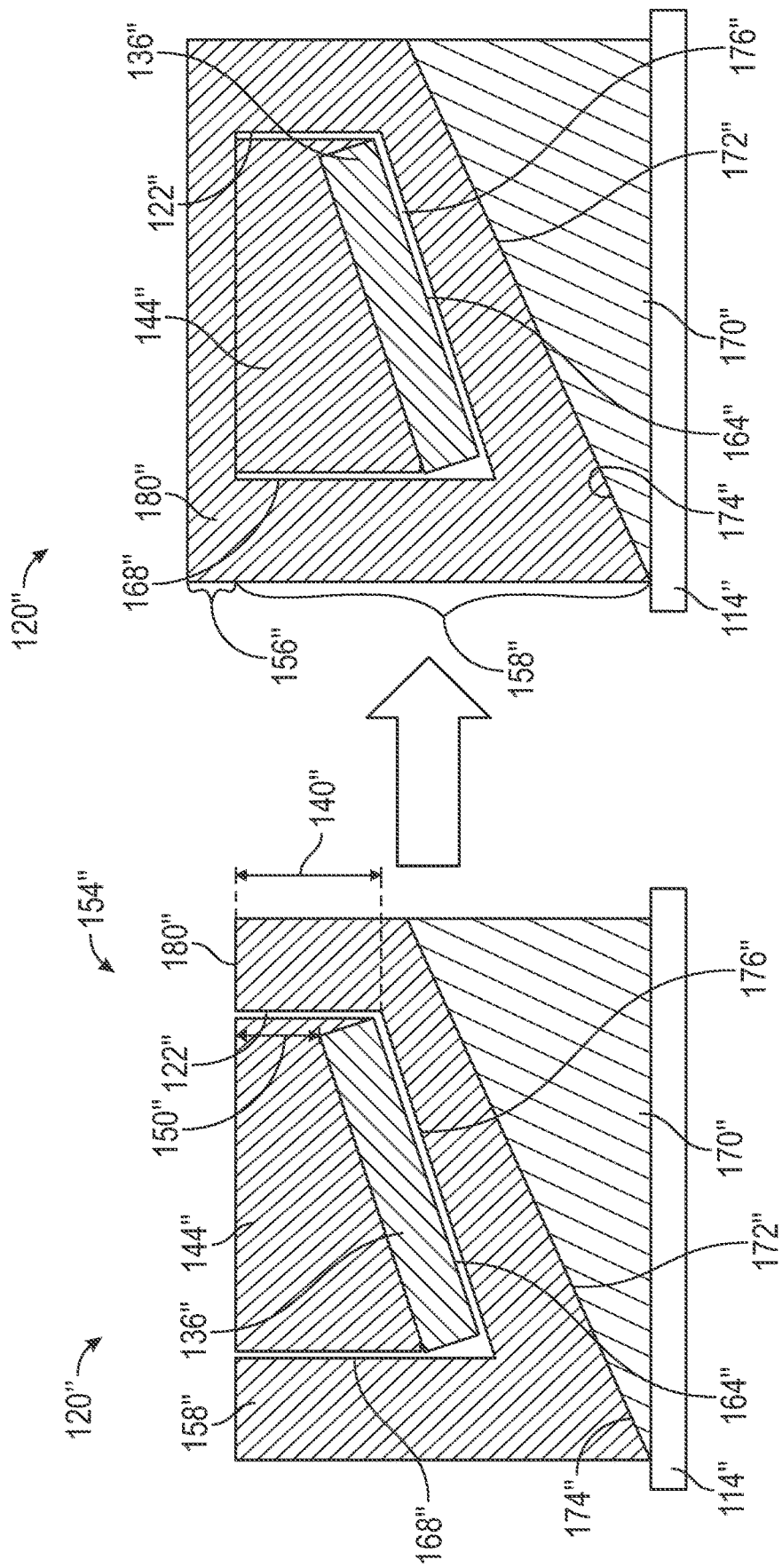
FIG. 4A illustrates a three-dimensional part including the magnets embedded therein according to embodiments of the present disclosure.
FIG. 4B illustrates a three-dimensional part including the magnets embedded therein according to embodiments of the present disclosure.

FIGS. 4A and 4B illustrates a three-dimensional part 120" with localized magnetic properties formed according to any of the above embodiments, wherein a removable support 170" is used to print the three-dimensional part 120". The support 170" allows the support bed-facing surface 172" of the three-dimensional part 120" to be non-parallel to a plane defined by support bed 114". While FIGS. 4A and 4B illustrate the support bed-facing surface 172" of the three-dimensional part 120" as a flat surface, at an angle to the support bed 114, in other embodiments, the support bed-facing surface 172" of the three-dimensional part 120" may be curvate or exhibit other, non-planar geometries. In further embodiments, the traces 116, 116n may be parallel to the support bed 114 or may follow the geometry of the part-facing surface 164" of the support 170".

In embodiments, the support 170" is printed using the three-dimensional printer 100. Alternatively, the support 170" may be formed separately and placed on the support bed 114 prior to printing the three-dimensional part 120". The support 170" may be formed from a polymer that is the same or different than that the first portion 158" of the three-dimensional part 120". In embodiments, the support material 170" may be water soluble or printed using a reduced trace thickness to allow for the support material 170" to be easily removed from the three-dimensional part 120".

The base 176" of the cavity 122" and magnet 136" may also be unparallel to the plane defined by the support bed 114". In addition, in further embodiments, the base 176" of the cavity 122" may also be non-planar to the support bed-facing surface 172" of the three-dimensional part 120". Further, the base 176" of the cavity 122" may also exhibit an independent geometry from the support bed-facing surface 162". For example, the base 176" of the cavity 122" may be curvate. In embodiments, the base 176" of the cavity 122" conforms to the surface 164" of the magnet 136" adjacent the base 176". It is also noted that the opening 154" defined by the cavity 122" may not be parallel to the base 176" of the cavity 122" and may be defined at an angle to the base 176" of the cavity 122'" as illustrated in FIGS. 4A and 4B. In addition, the side walls 178" of the cavity 122" may be provided at an angle that is not perpendicular to the base 176" of the cavity 122" as illustrated in the FIGS. 4A and 4B.

Further, as illustrated in FIGS. 4A and 4B, the cover 144" may exhibit any number of geometries to fill the remainder of the cavity 122" between the magnet 136" and upper surface 180" of the first portion 158" to create a printable surface for printing the remaining portion 156" of the three-dimensional part 120" on. In any of the above embodiments, the geometry of the cover 144, 144', 144" is generated using a composite function of one or more of 1) a distance and thermal mass to prevent the degaussing of the magnet 136, 136', 136" due to thermal degradation, and 2) a distance to keep the magnet 136, 136', 136" from interfering with printing the print process and extrusion barrel 110 as discussed further below. In aspects, the strength of the magnetic field exhibited by the magnet 136, 136', 136" is inversely correlated with distance and, depending on conditions, decays at a cube of the distance.

In addition, while the above illustrated embodiments include a single magnet 136, 136', 136", the three-dimensional part 120, 120', 120" according to any of the above embodiments may include more than one magnet. Further, while the above discusses fused deposition modeling, other methods of additive manufacturing may be used to form the parts herein, such as powder bed fusion or binder jetting.

In any of the embodiments described above, the polymer forming the filament 106 and the three-dimensional part 120, 120', 120" includes a thermoplastic or thermoset polymer material. In embodiments, the thermoplastic material includes, for example, a polymer selected from one or more of the following polymers: polyolefins, such as polypropylene or polyethylene, polyamide, polyethylene terephthalate, polylactic acid, acrylonitrile butadiene styrene, polyethylene terephthalate glycol, thermoplastic elastomer, thermoplastic urethane, high impact polystyrene, polyvinyl acetals, polycarbonate, acrylonitrile styrene acrylate, polyoxymethylene, poly(methyl methacrylate), polycarbonate/acrylonitrile butadiene styrene blends, thermoplastic copolyester, polyetherimide, and polyether ether ketone. In embodiments, the polymer is present in a copolymer and blends thereof including one or more additional polymers.

In embodiments, the cover 144, 144', 144" is formed of the same material as the three-dimensional part. In cases where the temperature of forming the second portion 156, 156', 156" of the three-dimensional part 120, 120', 120" may demagnetize the magnet 136, 136', 136", the cover 144, 144', 144" may be formed of a polymer that is thermally insulating. The thermally insulating material may exhibit a thermal conductivity k in the range of 0.1 W/(m*K) to 0.45 W/(m*K), including all values and ranges therein, as measured according to ASTM C177-19. In embodiments, the polymer includes a polymer selected from one or more of the following: polyimide, polyethylene, polypropylene, polyethylene terephthalate, polymethylmethacrylate, polyether ether ketone, polyamide, polybutylene terephthalate, polyphenylene sulfide, and acrylonitrile-butadiene-styrene. Further, the thermally insulating material include a foam including gas bubbles therein.

The magnet 136, 136', 136" is understood as a part that includes a material that produces a magnetic field. The magnet 136, 136', 136" may be a permanent magnet, exhibiting a persistent magnetic field or an electromagnet. In embodiments, the magnet 136, 136', 136" is a permanent magnet including a material selected from one or more of the following materials: ferrite, magnetite, lodestone, cobalt, nickel, gadolinium, barium/strontium carbonate ceramic, alnico, samarium-cobalt, neodymium-iron-boron, and magnesium-aluminum alloys. In further embodiments, the magnet 136, 136', 136" may include a magnetic material, including any of the above, in particulate form embedded in a polymer, ceramic or other non-magnetic material. In embodiments including an electromagnet as magnet 136, 136', 136", the magnet 136, 136', 136" is formed from a coiled wire including at least one loop, including more than one loop. In the case of an electromagnet present as the magnet 136, 136', 136", the three-dimensional part 120 defines openings (not illustrated) to allow for the wires of the electromagnet coil to pass through.

Figure 5:
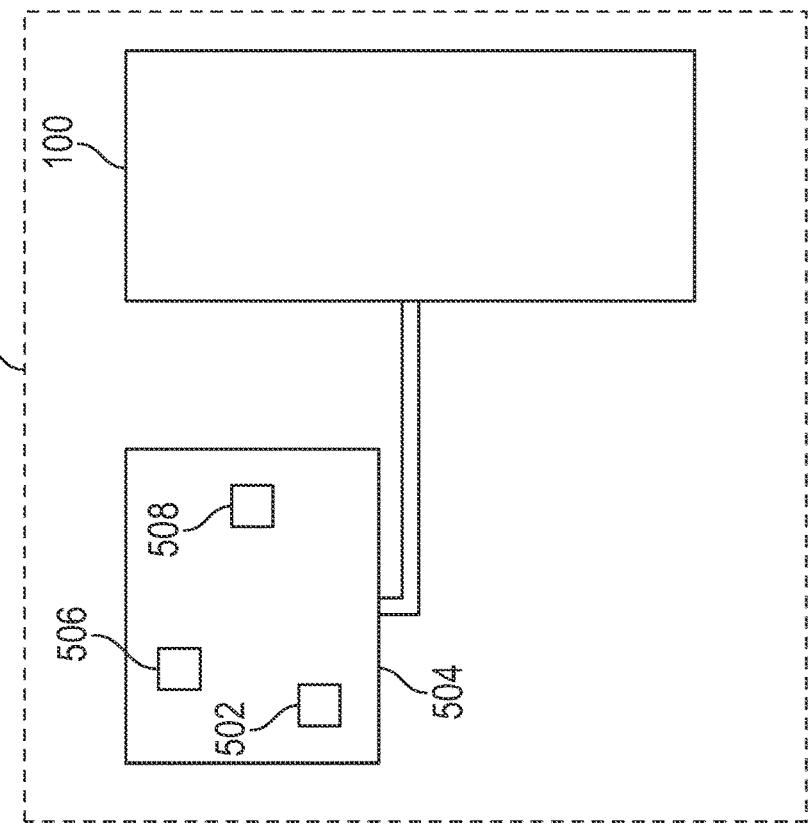
FIG. 5 illustrates a schematic of a system for determining the thickness of a cover for a magnet according to embodiments of the present disclosure.

In addition to the methods and part systems described above, the present disclosure is also directed to a system of forming a cover 144, 144', 144" for a magnet 136, 136', 136" used in a printed a three-dimensional part 120, 120', 120" for a vehicle. Turning now to FIG. 5, the system 500 includes a processor 502. The processor 502 may reside inside of a computer 504 independent of the printer 100, as illustrated, or the processor may be integrated into the printer 100. The processor includes hardware, firmware, and software for parsing, analyzing, and optimizing code for specifying and analyzing the geometry and materials of the of the cover 144, 144', 144" based on the magnets 136, 136', 136" of interest as well as, in some embodiments, the three-dimensional part 120, 120', 120". The processor 502 may include one or more processors, where the processors 502 perform distributed or parallel processing protocols. The processor 502 may include, for example, application specific integrated circuits, a programmable gate array including, e.g., a field programmable gate array, a graphics processing unit, a physics processing unit, a digital signal processor, or a front end processor. The processor 502 is understood to be preprogrammed to execute code or instructions to perform, for example, operations, acts, tasks, functions, or steps coordinating with other devices and components to perform operations when needed.

The processor 502 also includes or accesses information, stored in memory 506 with which the processor 502 is operatively coupled, regarding the various materials the magnets 136, 136', 136" may be formed from, as well as the various polymers used to form the cover 144, 144', 144" as well as, in some aspects, the three-dimensional part 120, 120', 120" and three-dimensional printer 100. Information regarding the magnets 136, 136', 136" includes, e.g., the magnet material, magnet strength, and demagnetizing (degaussing) temperature. Information regarding the polymer includes, for example, the processing temperature of the polymer, the heat transfer coefficient, and any shielding effects the polymer may exhibit. Information regarding the three-dimensional printer 100 include the material the extrusion barrel 110 is formed from. Memory is understood as a physical device capable of storing information temporarily, such as in the case of random-access memory, or permanently, such as in the case of read-only memory. Representative physical devices include hard drives, solid state drives, optical discs, or storage accessible through the cloud over networks.

Various inputs and outputs 508 may also be coupled to the processor 502, allowing a user to select various options or variables for executing the functions the processor 502 is configured to execute. Input/output devices 508 include, e.g., a keypad, buttons, a wireless input device, a thumbwheel input device, a track stick input device, a touch screen, a monitor, etc. In one example, the input/output device may display a graphical user interface (GUI) to the user, allowing the user to select one or more operations to configure the instructions executed by the processor 502.

Figure 6:
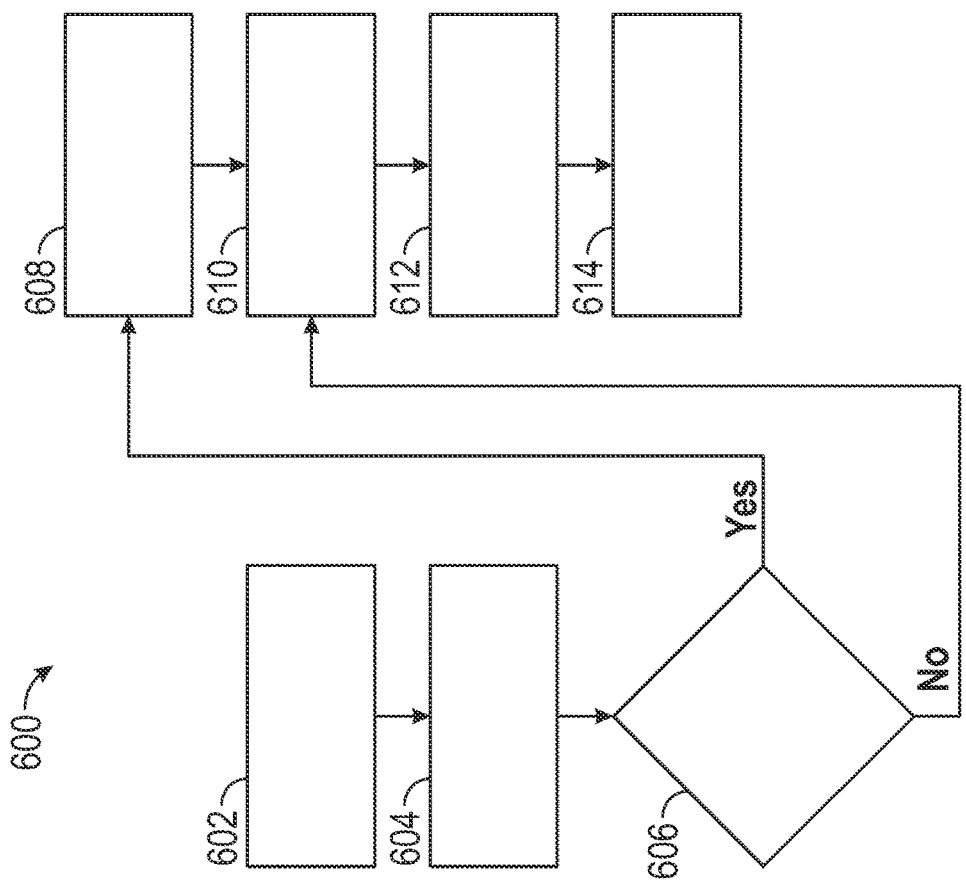
FIG. 6 illustrates a flowchart of a method for determining the thickness of a cover for a magnet according to embodiments of the present disclosure.

The processor 502 is configured to execute a set of instructions and algorithms to perform a method of analyzing and selecting a minimum thickness 150, 150', 150" of a cover 144, 144', 144" separating the magnet 136, 136', 136" from the extrusion nozzle 110 to prevent demagnetizing the magnet or interference between the magnet 136, 136', 136" with the extrusion nozzle 110. FIG. 6 illustrates a method of analyzing and specifying a cover 144, 144', 144" for use with a particular, selected magnet, i.e., a magnet selected by a user for use in a particular application. At block 602 a magnet 136, 136', 136" of a desired size and material is selected by a user. At block 604, the processor 502 accesses and references information stored in memory 506 including information regarding demagnetization temperatures and the strength of the magnetic field exhibited by the magnet 136, 136', 136", information regarding processing temperature for a given set of polymers to be used to form the three-dimensional part 120, 120', 120", information regarding the extrusion barrel 110 material used by the printer 100, etc. and the processor 502 begins executing an algorithm which determines an appropriate thickness for the cover 144, 144', 144" based upon the following factors: the material of the magnet 136, 136', 136" selected, the magnetic field strength of the magnet 136, 136', 136", the demagnetizing temperature of the magnet 136, 136, 136" material, the material the extrusion barrel 110 is formed of and whether that material is magnetic, the operating temperatures of the extrusion barrel 110 for a selected polymer the three-dimensional part 120, 120', 120" is formed from, etc.

At block 606, a determination is made as to whether the extrusion barrel 110 is ferromagnetic by referencing data stored in memory 506 regarding the materials the extrusion barrel 110 is made from. If the extrusion barrel 110 is ferromagnetic, at block 608 the gap required to prevent magnetic interference between the magnet 136, 136', 136" is determined by the processor 502 utilizing information regarding the type of material the extrusion barrel 110 is formed of and information regarding the magnetic strength and magnetic field of the magnet 136, 136', 136", and the method proceeds to block 610. In embodiments, a look-up table including minimum gaps to prevent magnetic interference based on the materials used in the magnet and extrusion barrels is created in advance using experimental data.

If at block 606 it is determined that the extrusion barrel 110 is not ferromagnetic, then the method skips block 608 and proceeds to block 610. At block 610, the gap required to prevent de-magnetization of the magnet 136, 136', 136" due to heat is calculated by the processor 502 based on information regarding the heat transfer coefficient of the polymer used in the cover 144, 144', 144" and the demagnetization temperature of the magnet 136, 136', 136". In making this calculation, one or more materials the cover 144, 144'; 144" may be formed of may be selected or suggested.

Figure 7:
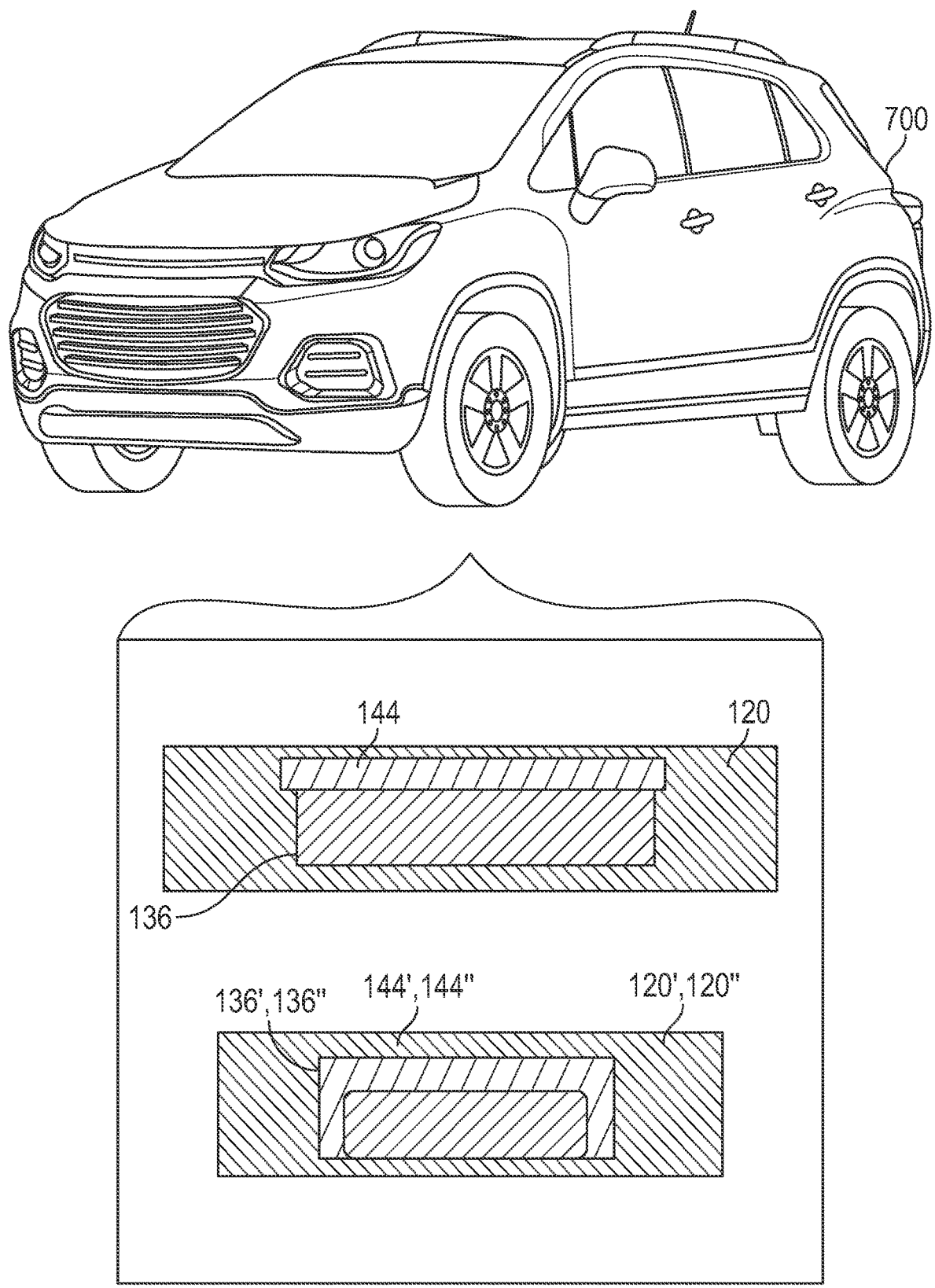
FIG. 7 illustrates a vehicle including a printed three-dimensional part including an embedded magnet according to several embodiments of the present disclosure.

At block 612, the gaps calculated at 608 and 610 are compared and the larger of the two gaps are selected for determining and specifying the minimum thickness of the cover 144, 144', 144". If a gap was not calculated at 608, then, for example, a null value is used and the thickness of the cover 144, 144', 144" is at least as large as the gap calculated at block 612. Optionally, at block 614, a cavity 122, 122', 122", and specifically, the minimum cavity depth 140, 148, 140', 140" in the three-dimensional part 120, 120', 120" may be selected to accommodate the magnet 136, 136', 136" and the cover 144, 144', 144". The selected thickness may then be implemented in, e.g., computer aided drafting software, or slicer software, FIG. 7 illustrates a vehicle 700 including a one or more three-dimensionally printed parts 120, 120', 120". The three-dimensionally printed parts 120, 120', 120" may be used for a variety of applications including housing magnetic sensors, for trim components, or for testing purposes.

Several advantages are offered by the method and systems for creating parts with localized magnetic properties using material extrusion and additive manufacturing. Such advantages include the ability to embed a magnet of any size, geometry, or magnetic strength in a three-dimensional part without adversely affecting the magnet or the printing process. Such advantages further include eliminating the need to hold a magnet in place while forming a three-dimensional part around the magnet. Furthermore, the use of the methods described herein allows for the creation of parts having various sizes and shapes with magnets embedded therein without the need to create a new tool or cavity. Further advantages include the elimination or reduction of post processing, including the ability to provide a smooth surface without cuts in the part or glue remnants. Yet further advantages include controlling the seating of the magnet and preventing the magnet from shifting or rattling within the cavity. Additional advantages include improvement in part quality, lift time of the magnet and the part.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of creating a three-dimensional part with localized magnetic properties for a vehicle, comprising:
    forming a first portion of the three-dimensional part by depositing a first plurality of successive layers onto a support bed from a ferromagnetic extrusion barrel, wherein the first portion of the three-dimensional part defines a cavity;
    inserting a magnet into the cavity, wherein the magnet is a permanent magnet;
    preforming a cover or printing the cover concurrently with the first portion of the three-dimensional part before inserting the cover on the magnet;
    inserting the cover on the magnet, wherein the cover is sized to form an interference fit with the cavity and is configured to exhibit a minimum thickness selected to prevent interference between the magnet and the extrusion barrel; and
    forming a second portion of the three-dimensional part by depositing a second plurality of successive layers onto the first portion of the three-dimensional part and the cover.

2. The method of claim 1, further comprising at least partially encapsulating the magnet in the cover and inserting the magnet, at least partially encased by the cover, into the cavity.

3. The method of claim 1, further comprising: inserting the magnet into a first portion of the cavity having a first width; and inserting the cover into a second portion of the cavity having a second width, wherein the first width is less than the second width.

4. The method of claim 1, further comprising preforming the cover using a molding process.

5. The method of claim 1, further comprising forming a support and forming the first portion of the three-dimensional part on the support.

6. The method of claim 1, wherein the magnet is selected from one or more of the following materials: ferrite, magnetite, lodestone, cobalt, nickel, gadolinium, barium/strontium carbonate ceramic, alnico, samarium-cobalt, neodymium-iron-boron, and magnesium-aluminum alloys.

7. The method of claim 1, wherein the first plurality of successive layers and second plurality of layers are formed from a polymer filament.

8. The method of claim 7, wherein the polymer filament includes a polymer selected from one or more of the following polymers: polypropylene, polyethylene, polyamide, polyethylene terephthalate, polylactic acid, acrylonitrile butadiene styrene, polyethylene terephthalate glycol, thermoplastic elastomer, thermoplastic urethane, high impact polystyrene, polyvinyl acetals, polycarbonate, acrylonitrile styrene acrylate, polyoxymethylene, poly(methyl methacrylate), polycarbonate/acrylonitrile butadiene styrene blends, thermoplastic copolyester, polyetherimide, and polyether ether ketone.

9. The method of claim 8, wherein the second plurality of successive layers are formed from a different polymer than the first plurality of successive layers.

10. The method of claim 1, wherein the cover is formed from a polymer material exhibiting a thermal conductivity k in the range of 0.1 W/m*K to 0.45 W/m*K.

11. The method of claim 1, wherein the cover is formed from a third plurality of successive layers formed from a polymer filament.

12. The method of claim 11, wherein the polymer filament of the third plurality of successive layers includes a polymer selected from one or more of the following polymers: polyimide, polyethylene, polypropylene, polyethylene terephthalate, polymethylmethacrylate, polyether ether ketone, polyamide, polybutylene terephthalate, polyphenylene sulfide, and acrylonitrile-butadiene-styrene.

13. The method of claim 12, wherein the polymer includes a foam including gas bubbles.

14. The method of claim 1, wherein the cover exhibits a first width, and the magnet exhibits a second width, wherein the first width is greater than the second width.

15. The method of claim 14, wherein the cover at least partially encases the magnet.

16. The method of claim 1, further comprising selecting the minimum thickness of the cover based on the following factors: the material of the magnet, the magnetic field strength of the magnet, the demagnetization temperature of the magnet, the material of the ferromagnetic extrusion barrel, and the operating temperature of the extrusion barrel.

17. The method of claim 1, further comprising selecting the minimum thickness of the cover to prevent demagnetization of the magnet based on the heat transfer coefficient of a polymer used to form the cover and the demagnetization temperature of the magnet.

18. The method of claim 1, wherein the magnet exhibits an interference fit with a first portion of the cavity.

19. The method of claim 1, further comprising selecting a depth of the cavity based on the minimum thickness of the cover and the magnet.

20. The method of claim 1, wherein a base of the cavity conforms to a surface of the magnet adjacent to the base.

* * * * *